United States Patent Office 2,888,628
Patented May 26, 1959

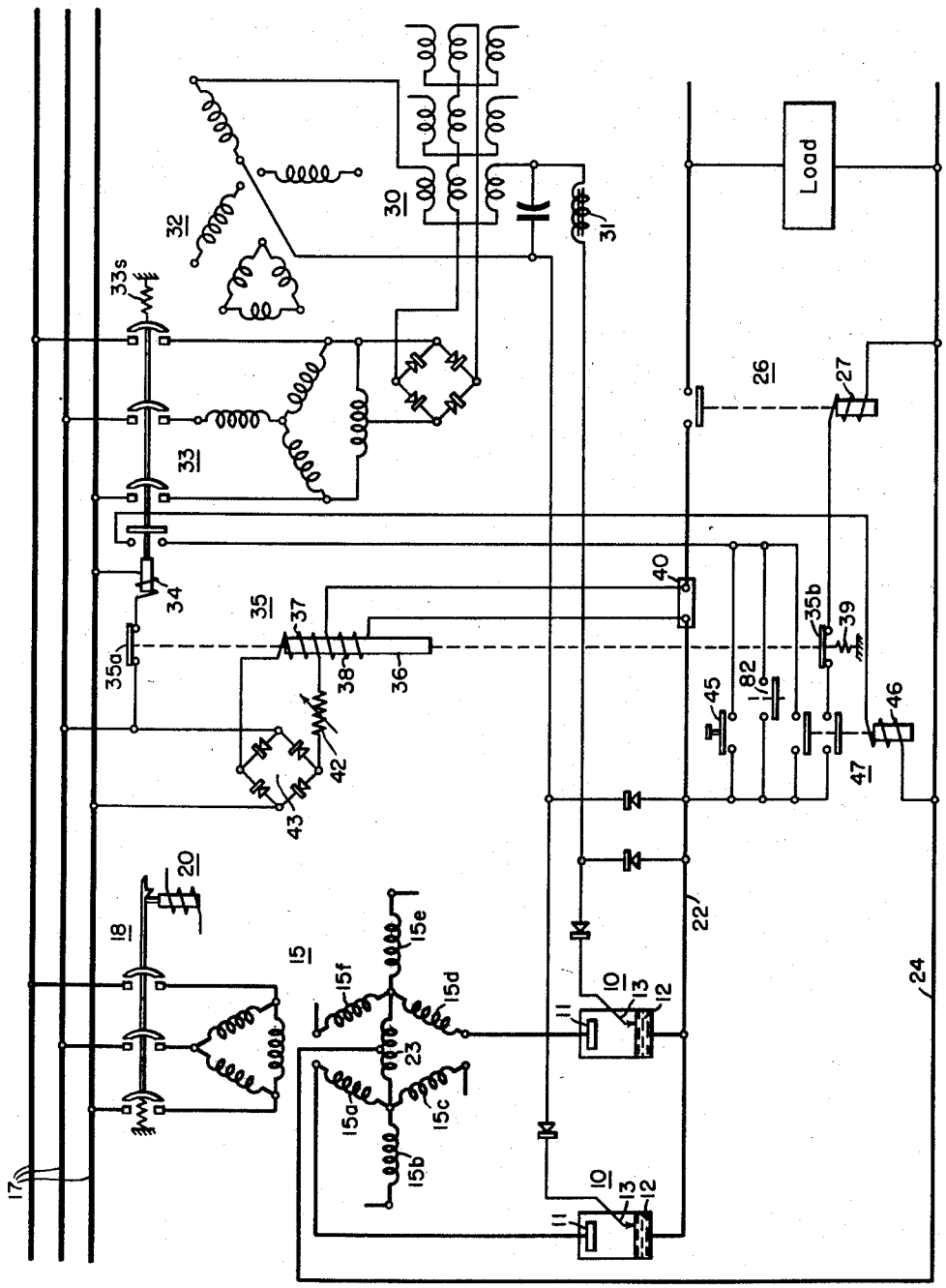

2,888,628

PROTECTIVE APPARATUS AND SYSTEMS

Carl A. Christian, Turtle Creek, and Guy W. Champney, Pitcairn, Pa., assignors to Westinghouse Electric Corporation, East Pittsburgh, Pa., a corporation of Pennsylvania Application July 6, 1954, Serial No. 441,544

7 Claims. (Cl. 321—11)

Our invention relates generally to protective apparatus and systems, and it has reference in particular to protective apparatus for protecting rectifiers against overcurrent and reverse current.

Generally stated, it is an object of our invention to provide a simple and effective protective circuit for protecting rectifiers of the arc discharge type against overcurrent and reverse current.

More specifically, it is an object of our invention to provide in a rectifier control system for using a single relay having opposed current and voltage windings for protecting the rectifiers against both overcurrent and reverse current.

It is an object of our invention to provide in a protective system for using a relay having opposing voltage and current windings for effecting operation of the relay either upon a predetermined value of overcurrent or a relatively slight value of reverse current.

Another object of our invention is to provide for using a single inexpensive relay for controlling the excitation of a rectifier for protecting a rectifier against either a relatively large value of overcurrent or a relatively small value of reverse current.

It is also an object of our invention to provide for using a voltage bias winding on a relay for opposing the effects of a current winding flow for a normal direction of current flow so as to render the relay operative in response to either a heavy overcurrent over a light reverse current.

Yet another object of our invention is to provide in a rectifier system for using a single overcurrent and reverse current responsive relay for both interrupting the excitation current of the rectifier and causing the direct current circuit breaker or contactor to open.

Other objects will in part be obvious and will in part be explained hereinafter.

In practicing our invention in accordance with one of the embodiments, a single protective relay is provided for effecting interruption of the excitation circuit of a rectifier of the arc discharge type, and effecting operation of the cathode circuit breaker or contactor to interrupt the direct current load circuit in response to either an overcurrent or a current reversal. The protective relay is spring-biased to normally maintain its contact closed, and has voltage and current windings which normally oppose each other, so that only a slight reversal of current which aids the voltage winding results in operation of the relay, whereas a relatively large value of overcurrent is required in the forward direction to first overcome the bias effect of the voltage winding before providing sufficient flux for operating the relay.

For a more complete understanding of the nature and scope of our invention, reference may be made to the following detailed description which may be read in connection with the accompanying drawing in which the single figure is a diagrammatic view of a rectifier system embodying the invention in one of its forms.

Referring to the drawing, the reference numeral 10 may denote several of a plurality of mercury arc rectifier devices each having an anode 11, a cathode 12 and an excitation or control electrode 13. The rectifier devices are connected by means of a polyphase transformer 15 to the conductors 17 of an alternating current supply circuit through an alternating current circuit breaker 18, which may be of any suitable type, and is shown schematically as being latched by means of a trip device 20. The anodes 11 are connected in a manner well-known in the art to the several secondary windings 15a, 15b, etc. of the transformer 15, while the cathodes are connected to a cathode bus conductor 22. An interphase transformer 23 provides the connection for the negative bus conductor 24 for supplying a load through a direct current contactor 26 having an operating winding 27.

The control electrodes 13 are connected by means of a phase shifting reactor 30 and saturating reactors 31 to the secondary windings of an excitation transformer 32. The transformer 32 is connected by means of an excitation contactor 33 to the alternating conductors 17. The contactor 33 may be of any suitable type, and is herein shown as being biased open by a spring 33S and having an operating winding 34 which is energized to close the contactor.

In order to provide the rectifier devices 10 with protection against both overcurrent and reverse current, a protective relay 35 is provided having an armature 36 with voltage and current windings 37 and 38 respectively for operating it to open normally closed contact 35a, 35b which are normally biased closed by a spring 39. The current winding 38 is connected to a shunt 40 in the cathode bus conductor for operating the relay 35 in accordance with the direction and value of current in the cathode circuit. The voltage winding 37 is connected through an adjustable impedance 42 and a rectifier bridge circuit 43 to the alternating current conductors 17 in opposition to the normal direction of current flow so as to provide a bias effect. This requires a relatively large value of overcurrent to first neutralize the magnetic flux produced by the voltage winding before the current winding will be effective to operate the relay when the current is flowing in the forward direction. Since a reversal of current in the cathode circuit produces a flux which assists that of the voltage winding, the relay is responsive to a relatively small value of a reverse current.

In normal operations, the circuit breaker 18 will be closed and the excitation contactor 33 will be also closed since its operating winding 34 is connected directly to the alternating current conductors through the normally closed contact 35a. The direct current contactor 26 may then be closed by operating a push-button switch 45 which completes an energizing circuit for the operating winding 46 of the closing relay 47 of the direct current contactor 26. This provides an energizing circuit for the operating winding 27 of the direct current contactor. Automatic reclosing may be effected by any suitable type of reclosing device, represented for example by the contact 82 of a reclosing relay.

With the current flowing to the load in the normal direction, the magnetomotive force of the current winding 38 will be opposed by both the spring 39 and the magnetomotive force of the voltage winding 37. By adjusting the impedance 42 and the tension of the spring 39, the relay 35 may be made to operate for any desired value of overcurrent from 100 to 200 percent of normal load value. Whenever the current exceeds the predetermined value, the relay operates by opening contacts 35a and 35b. The excitation contactor 33 opens almost immediately, since it is a relatively light and high speed type of device, thus removing the excitation from the rectifier devices 10 before the direct current contactor 26 can open since the direct current contactor is in a heavier current circuit and has a greater inherent time delay than the lighter duty excitation contactor. Accordingly, the exitation will be completely removed from the rectifier devices before the direct current circuit is interrupted.

Should a reversal of current occur while the system is operating, the magnetomotive force of the current winding 38 will be reversed from the normal direction and will add to that of the voltage widing 37. Since the magnetomotive force of the voltage winding is almost sufficient to overcome the bias effect of the springs 39 only a relative reversal of current is necessary to effect operation of the relay 35. When the relay operates, the excitation circuit is first interrupted and then the direct current contactor is then disconnected to completely deenergize the circuit.

From the above description and the accompanying drawing, it will be apparent that we have provided a simple and effective manner for using a single relay to protect a rectifier system against both overcurrent and reverse current. By using a spring biased relay having a voltage bias winding on the relay, fast response is obtained both for heavy overcurrents and for small reversals of current, with a high degree of accuracy and reliability. A protective relay embodying the teaching of our invention is simple and inexpensive to manufacture and is reliable and effective in operation. The cost reduction is on the order of from 50 to 75 percent of the present apparatus. Interposing relays are omitted with a resulting faster tripping operation.

Since certain changes may be made in the above-described construction and different embodiments of the invention may be made without departing from the spirit and scope thereof, it is intended that all the matter contained in the above description and shown in the accompanying drawing shall be considered as illustrative and not in a limiting sense.

We claim as our invention:

1. A protective system for a rectifier having an excitation circuit and a cathode circuit comprising, a relay having separable contacts for effecting interruption of the excitation and cathode circuits, means biasing said contacts closed, a voltage winding opposing said biasing means in part, and a current winding operable to effect separation of said contacts upon either an overcurrent or a reverse current, said current winding being connected to be energized in opposition to the voltage winding in accordance with the current in the cathode circuit for a normal direction of current.

2. In a rectifier system, a rectifier having an excitation circuit and a cathode circuit, switch means for connecting the excitation circuit to a source of alternating current, additional switch means connecting the cathode circuit to a direct current load circuit, a protective relay having separable contacts for effecting operation of both switch means to disconnect the excitation and cathode circuits from the alternating current source and load circuit respectively, biasing means biasing said contacts closed, a voltage winding connected to a source of direct current for opposing said biasing means, and a current winding operable to effect separation of said contacts for either direction of current, said winding being connected to be energized in accordance with the current in the cathode circuit in opposition to the voltage winding for a normal direction of current flow in the cathode circuit.

3. Protective apparatus for a rectifier having a cathode and excitation means comprising, circuit means including a switch for connecting the cathode to a direct current load circuit, circuit means including an additional switch for connecting the excitation means to a source of alternating current, said additional switch means having a faster operating characteristic than said cathode switch, and means operable to open said switches including a relay having a voltage winding energized in one sense and a current winding energized in accordance with the current in the cathode circuit in opposition to the voltage winding for a normal direction of current flow to effect operation of the relay in the same sense for an overcurrent and a reverse current.

4. Protective apparatus for a rectifier having a cathode and excitation means comprising, an excitation contactor operable to connect the excitation means to an alternating current excitation source, a cathode contactor operable to connect the cathode to a direct current load circuit, relay means having contacts normally closed for connecting the contactors to sources of electrical energy for operating them and having voltage and current windings opposed for a normal direction of current and cumulative for a reverse current for producing a magnetic flux to separate said contacts, said current winding requiring energization in different degrees in accordance with the direction of current in the load circuit to effect separation of said contacts.

5. Protective apparatus for a contactor having an operating winding energizable to close the contactor comprising, a relay having separable contacts connected in circuit with the operating winding, a spring biasing the contacts closed, an armature movable to effect separation of the contacts, a voltage winding urging the armature to separate the contacts, means including an adjustable impedance effecting energization of the voltage winding in different predetermined degrees, and a current winding connected differentially with respect to the voltage winding for a normal direction of current flow, said current winding being so positioned relative to the armature as to effect movement thereof to separate the contacts for a high value of overcurrent and a small value of reverse current.

6. Protective apparatus for a rectifier having a cathode and excitation means comprising, a contactor operable to connect the excitation means to an alternating current excitation source, another contactor operable to connect the cathode to a direct current load circuit, and a relay having normally closed contacts providing operating circuits for said contactors, biasing means holding said contacts closed, and voltage and current windings connected differentially with respect to each other for providing a differential magnetic flux opposing the biasing means, said current winding being energized in accordance with the direction and value of current in the load circuit and differential with respect to the voltage winding for a forward direction of current flow.

7. Protective apparatus for a rectifier having excitation means and a cathode comprising, a circuit including a cathode contactor having an operating winding for operating it to connect the cathode to a direct current load circuit, another circuit including a circuit breaker having a closing winding operating the breaker for connecting the rectifier to a source of alternating current, an additional circuit including a contactor having an operating winding for operating it to connect the excitation means to the alternating current source, a relay normally connecting the breaker closing winding to the cathode circuit and the contactor operating winding to the alternating current source, respectively, said relay having an operating winding connected to be energized in accordance with the direction and value of cathode current and having a voltage bias winding in opposition to the normal direction of cathode current so that the current winding operates the relay in the same sense for an overcurrent above a predetermined value and for a reverse current also.

References Cited in the file of this patent

UNITED STATES PATENTS

| 1,320,125 | Chubb | Oct. 28, 1919 |
| 1,863,162 | Keller | June 14, 1932 |
| 2,053,445 | Rose | Sept. 8, 1936 |
| 2,209,818 | Hauffe | July 30, 1940 |
| 2,510,616 | Bany et al. | June 6, 1950 |
| 2,561,967 | Berguall et al. | July 24, 1951 |